United States Patent [19]

Spivey et al.

[11] Patent Number: 4,883,348
[45] Date of Patent: Nov. 28, 1989

[54] WIDE FIELD OPTICAL SYSTEM

[76] Inventors: Brett A. Spivey, 131 Seeman, Encinitas, Calif. 92024; Brian W. Neff, 9685 Genessee Ave. #F-2, San Diego, Calif. 92121; Murray R. Dunn, 8870-202 Villa La Jolla Dr., La Jolla, Calif. 92037

[21] Appl. No.: 204,902

[22] Filed: Jun. 10, 1988

[51] Int. Cl.⁴ .................. G02B 17/06; G02B 17/08; G02B 26/10
[52] U.S. Cl. .................... 350/503; 350/6.9; 350/486; 250/203 R
[58] Field of Search ............... 350/503, 504, 505, 619, 350/620, 622, 486, 1.2, 1.1, 6.5, 6.91, 6.9; 250/203 R, 216; 455/619

[56] References Cited

U.S. PATENT DOCUMENTS

| | | | |
|---|---|---|---|
| 3,443,853 | 5/1969 | Todd | 350/504 |
| 3,460,886 | 8/1969 | Rumsey | 350/620 |
| 3,524,526 | 9/1970 | Silvertooth | 350/620 |
| 3,899,145 | 8/1975 | Stephenson | 250/203 R |
| 3,961,179 | 6/1976 | Kuffer | 250/203 R |
| 4,025,783 | 5/1977 | Fletcher et al. | 350/504 |
| 4,101,195 | 7/1978 | Korsch | 350/505 |
| 4,395,695 | 7/1983 | Horton | 350/505 |
| 4,407,567 | 10/1983 | Michelet et al. | 350/619 |
| 4,427,878 | 1/1984 | Buchtel et al. | 250/203 R |
| 4,521,068 | 6/1985 | Schulte in den Baumen | 350/505 |
| 4,695,139 | 9/1987 | Bagby et al. | 350/620 |

OTHER PUBLICATIONS

David R. Shafer, Large Telescope Designs with a Spherical Primary Mirror, 1979, SPIE, vol. 172, Instrumentation in Astronomy III.

*Primary Examiner*—Jon W. Henry

[57] ABSTRACT

A telescope with a spherical primary mirror and a movable secondary optical element which is positioned at various locations near the focal plane of the primary mirror and directs a portion of the focused radiation to a coude optics device at the center of curvature of the primary mirror. The coude optics device reflects the focused radiation to a detector. In a preferred embodiment of this invention a field of several degrees can be scanned very rapidly while viewing much smaller object fields.

14 Claims, 5 Drawing Sheets

WIDE FIELD OPTICAL SYSTEM

The invention relates to the field of telescope instruments and more particularly it relates to fast scanning telescopic systems.

BACKGROUND OF THE INVENTION

Classical telescopes have very limited fields-of-view, typically <1° and at most 5°. Scanning rates for current telescope are typically very slow. A need exists for a telescope capable of very rapidly scanning a wide field and examining in detail many objects of interest in that field. Prior art methods of rapid scanning include the use of a conventional telescope and a scanning mirror larger than the aperture of the telescope. The mirror is positioned to reflect radiation from targets within the target range into the aperture of the telescope. Such mirrors are relatively heavy making rapid scanning (including stopping and starting) difficult.

SUMMARY OF THE INVENTION

The present invention provides a telescope with a spherical primary mirror and a movable lightweight secondary optical element which is positioned at various locations near the focal surface of the primary mirror and directs a portion of the focused radiation to a coude optics device at the center of curvature of the primary mirror. The coude optics device reflects the focused radiation to a detector. In a preferred embodiment of this invention a field of several degrees can be scanned very rapidly while stopping periodically to view much smaller object fields.

DETAILED DESCRIPTION OF THE PREFERRED EMBODIMENTS

Figure 1:
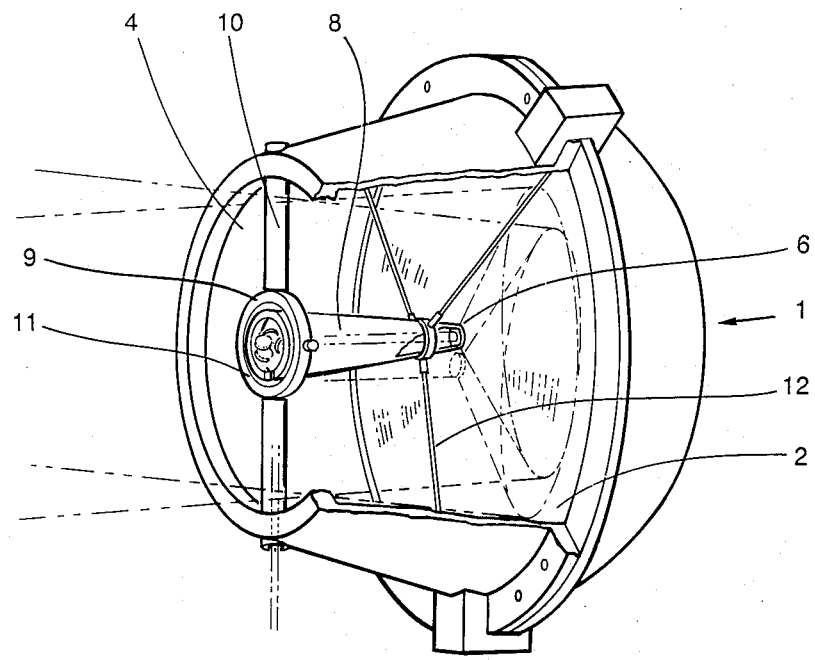
FIG. 1 is a sketch of a preferred embodiment of the invention.
Figure 2:
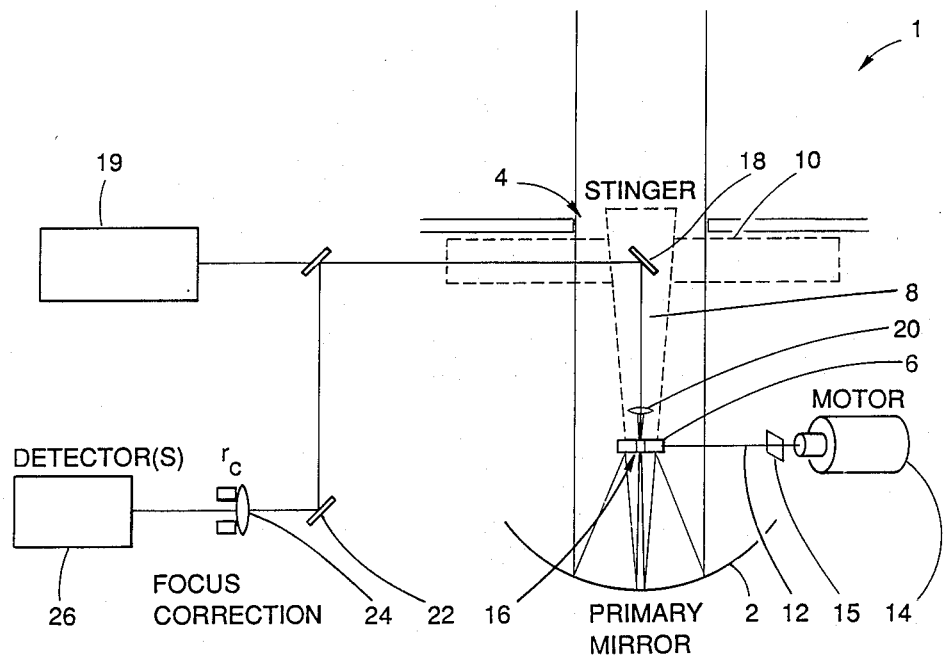
FIG. 2 is a diagramatic representation of a preferred embodiment of the invention.

Preferred embodiments of the optical system of the present invention is illustrated in the figures. The key elements are as shown in FIGS. 1 and 2. A 1 m diameter spherical primary mirror 2 has 0.5 m diameter circular aperture stop 4 centered at the center curvature of the mirror.

This embodiment incorporates a positive reflecting secondary mirror 6 located at one end of a lightweight pivot arm which we call a stinger 8. An inner gimbal 9 is attached at the other end of stinger 8 and an outer gimbal 11 is attached to brace 10 to permit stinger 8 to pivot about the center of curvature of primary mirror 2. Three cables 12 are attached to pivot arm 8 near secondary mirror 6. These cables are controlled by motors 14 and capstan assembly so as to control the movement of secondary mirror along a surface which is near the surface defined by the paraxial focus of the primary mirror 2. Secondary mirror 6 preferably is an oblate spheroid with higher aspheric terms to balance the spherical aberration inherent in a low F#spherical primary. The diameter of the secondary is about 4.5 cm, it has a 1.0 cm diameter hole in its middle.

Figure 3:
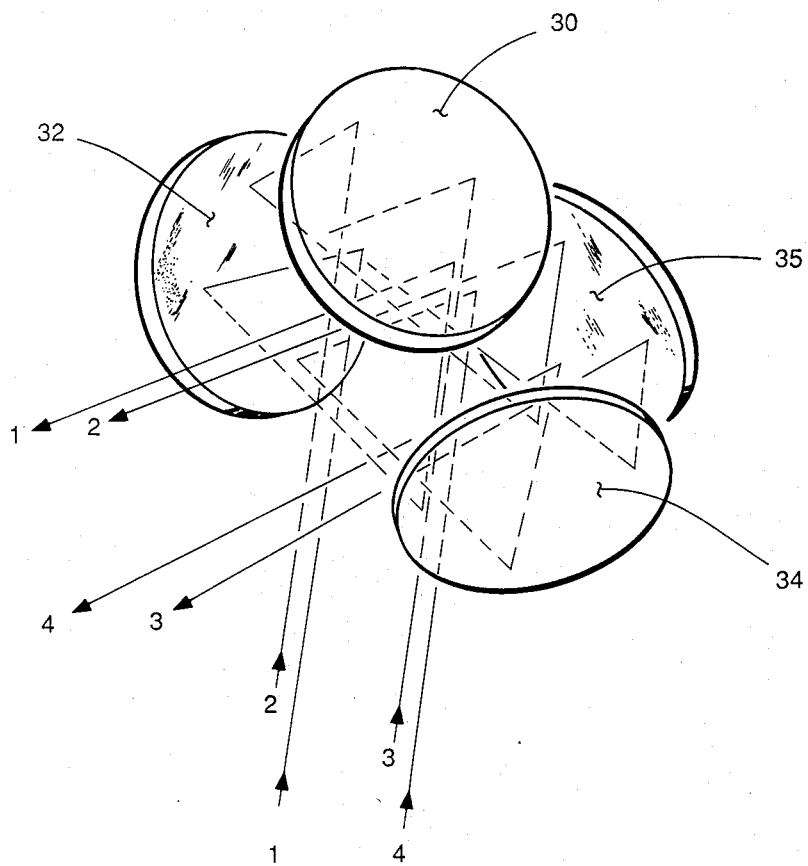
FIG. 3 is a sketch showing a coude optics arrangement.

Rays passing through aperture 4 reflect off primary mirror 2 then reflect off secondary mirror 6 back to primary mirror 2 then back through a hole 16 in the center of the secondary mirror 6 and reflect off a coude" optics arrangement 18 at the center of curvatures. To reduce the diameter of the beam through the coude" path, a collimating lens 20 is preferably located at an appropriate position along the optical axis. The coude" arrangement relays the beam out of the main system. The coude" optics arrangement in the preferred embodiment is a four mirror arrangement as shown in FIG. 3. In this arrangement mirrors 30 and 32 move with inner gimbal 9 and mirrors 34 and 36 move with outer gimbal 11. Mirror 32 is located on the pivot axis of stinger 8 and mirror 35 is located on the pivot axis of outer gimbal 11.

The beam is reflected from the coude optics arrangement 18 to fast steering mirror 22 and is focused by lens 24 on to detectors 26. Thus, gross scanning is accomplished by movement of stinger 8 and fine scanning is accomplished by movement of fast steering mirror 22. This arrangement permits extremely fast and accurate scanning.

Provisions may be made for the addition of adaptive optics to compensate for static or moving aberrations if required. The adaptive optics are located outside the main system and therefore do not affect dynamic performance of the moving secondary mirror.

Figure 4:
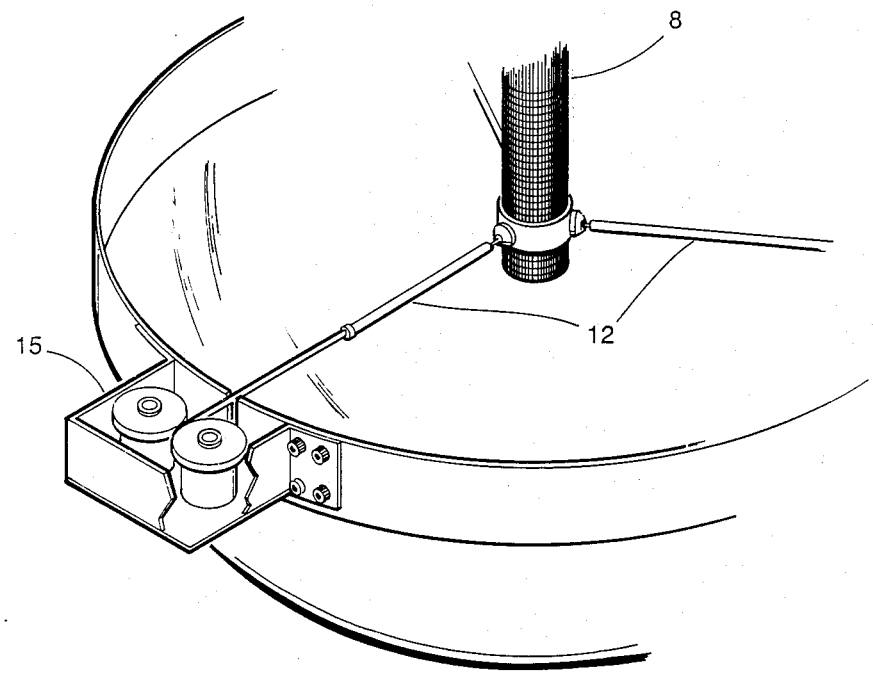
FIG. 4 is a sketch showing the operation of a positioning means for a preferred embodiment of the invention.

In our preferred embodiment the secondary mirror can be rapidly positioned at any location along a surface about 2 cm removed from the focal surface of the primary mirror. The major components of the positioning system are shown in FIG. 4. They include the stinger 8, the drive cables 12, and the capstan assembly 15.

Reactionless operation was reviewed for application to the design. Counter rotating masses synchronized with the motion of the pivot arm would eliminating major torques into structure, while the pivot arm reactions may be either eliminated by a passive reaction at its base by active masses coupled into the drive system.

A positioning system positions the pivot arm 8 and the attached secondary mirror 16 to provide the correct pointing angle. It does this by generating the drive signals for the stinger drive motors in response to feedback primarily from the motor position sensors and an angle sensing interferometer 19.

The control of the drive motors is preferably performed with a computer system which may be easily constructed and programmed by persons skilled in that art. Such computer systems provide extremely fast positioning of the secondary reflector 6 and much faster positioning of fast steering mirror 22.

Figure 5:
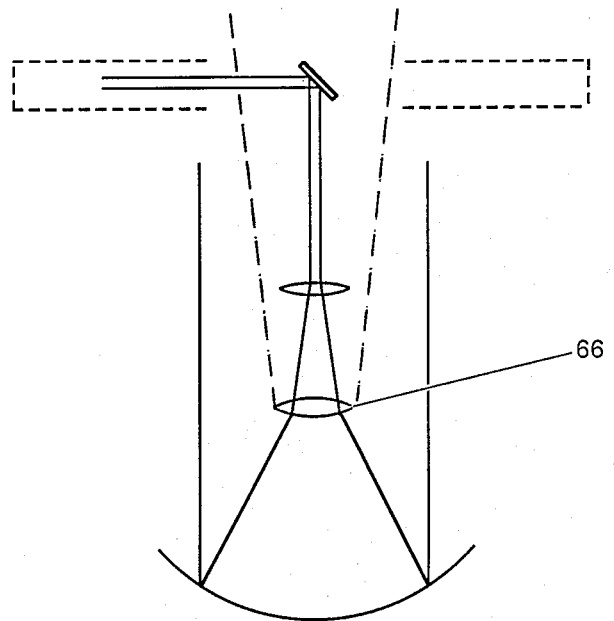
FIG. 5 is a sketch showing a lens as secondary optical means.

It should be stated that the secondary mirror 6 could be replaced with a lens 66 as indicated in FIG. 5 without substantial change in the nature of the telescope. In this case the rays reflecting off mirror 2 merely pass through lens 66 to coude" optics arrangement 18. Also, the 4 mirror arrangement shows in FIG. 3 could be replaced by a mirror operated on half-angle gears. Persons skilled in the art will recognize that device described herein can serve as a transmitter of laser radiation. This can be accomplished in a number of ways. For example, detector 26 shown in FIG. 2 could be replaced with a laser source. Also, the device could be used simultaneously as a laser transmitter and a viewing device by having a detector and a laser source share a common aperture. This can be accomplished by locating a beam splitter and/or a chopper between fast steering mirror 22 and lens 24.

While the above description contains many specificities, the reader should not construe these as limitations on the scope of this invention, but merely as exemplifications of preferred embodiments thereof. Those skilled in the art will envision many other possible variations which are within its scope.

Accordingly, the reader is requested to determine the scope of the invention by the appended claims and their legal equivalents and not by the examples which have been given.

What is claimed is:

1. A telescope system for detecting electromagnetic radiation within a viewing range comprising:
    a spherical concave primary mirror defining a focal surface and center of curvature,
    a secondary optical means for directing beams of radiation reflected off said primary mirror to the vicinity of said center of curvature,
    a positioning means for positioning said secondary optical means tangentially about said center of curvature at a plurality of positions, each of said plurality of positions being near said focal surface and the same distance from said focal surface,
    a detector means for detecting all or a portion of said beams of radiation,
    said primary mirror, said secondary optical means, said positioning means and said detector means, being arrange so that said positioning means positions said secondary optical means so as to permit said telescope system to scan said viewing range and to permit said detector means to detect all or portions of said beams of radiation within said viewing range without movement of said primary mirror or said telescope systems as a whole.

2. The telescope system of claim 1 and further comprising a steering means for steering said beams of radiation to said detector.

3. The telescope system of claim 2 wherein said steering means comprises a fast steering mirror.

4. The telescope system of claim 1 wherein said detector means is a moveable detector.

5. The telescope system of claim 1 wherein said positioning means comprises a pivot arm pivoted about a point on or near said center of curvature.

6. The telescopic system of claim 5 wherein said secondary optical means is a mirror having a hole at or near its center.

7. The telescopic system of claim 1 further comprising a coude optics means located at said center of curvature for directing said beams of radiation to said detector.

8. The telescopic system of claim 2 further comprising a coude optics means located at said center of curvature for directing said beams of radiation to said steering means.

9. The telescopic system of claim 1 further comprising an inner gimbal and an outer gimbal located so as to permit pivoting about said center of curvature.

10. The telescopic system of claim 8 further comprising a coude optics means located at said center of curvature for directing said beams of radiation to said steering means.

11. The telescopic system of claim 10 wherein said coude optics means comprises four mirrors, two of which are mounted on said inner gimbal and two of which are mounted on said outer gimbal.

12. A telescope system for transmitting beams of electromagnetic radiation to a plurality of targets within a target range comprising:
    a spherical concave primary mirror defining a focal surface and center of curvature,
    a secondary optical means for expanding said beams and directing said beams to said primary mirror, a coude optics means located at said center curvature for receiving said beams of radiation and directing said beams to said secondary optical means,
    a positioning means for positioning said secondary optical means tangentially about said center of curvature at a plurality of positions each of said plurality or positions being near said focal surface and the same distance from said focal surface,
    said primary mirror, said secondary optical means, said coude optics means and said positioning means being arranged so that said positioning means positions said secondary optical means so as to permit said telescope system to transmit beams of radiation to a plurality of targets within said target range, without movement of said primary mirror or the telescope system as a whole.

13. The telescopic system of claim 12 wherein said positioning means comprises a pivot arm pivoted about a point on or near said center of curvature.

14. The telescopic system of claim 12 wherein said secondary optical means comprises a mirror having a hole at or near its center.

* * * * *